Aug. 26, 1969  W. BAUERLE ET AL  3,463,951
ELECTRIC MOTOR AND GEAR TRAIN WITH ANTIVIBRATION
HOUSING ARRANGEMENT
Filed May 2, 1968
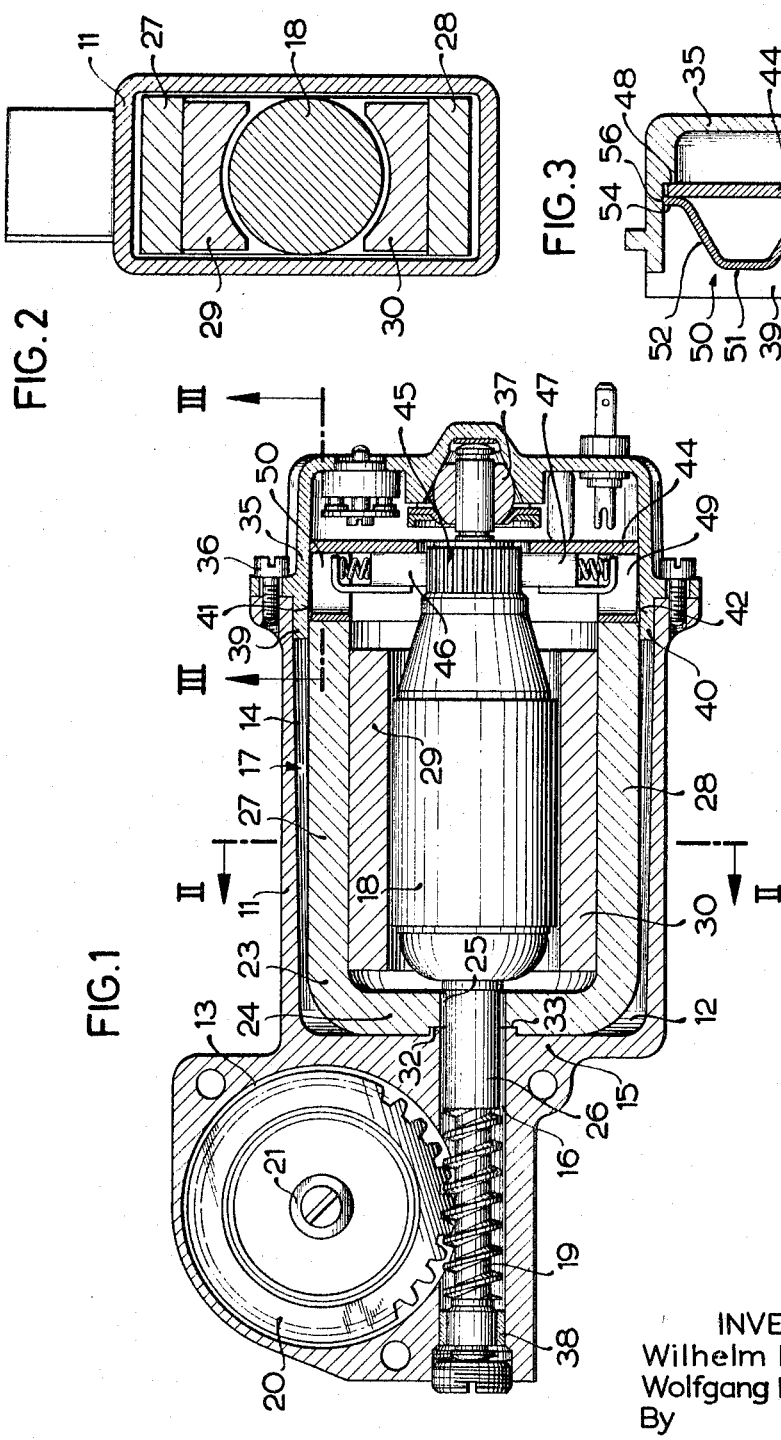
INVENTORS
Wilhelm BAUERLE
Wolfgang RENTSCH
By
*Michael S. Strecher*
their ATTORNEY United States Patent Office 3,463,951
Patented Aug. 26, 1969

3,463,951
ELECTRIC MOTOR AND GEAR TRAIN WITH ANTIVIBRATION HOUSING ARRANGEMENT
Wilhelm Bauerle, Stuttgart-Rohracker, and Wolfgang Rentsch, Schwieberdingen, Germany, assignors to Robert Bosch GmbH, Stuttgart, Germany
Filed May 2, 1968, Ser. No. 726,100
Claims priority, application Germany, May 6, 1967, B 92,397
Int. Cl. H02k 5/24, 7/06, 7/10
U.S. Cl. 310—51    13 Claims

ABSTRACT OF THE DISCLOSURE

A drive arrangement includes a housing having a chamber which defines an axis of rotation. An open end of the housing is closed by a cover. An electromotor is received in the housing, including a magnet arrangement which is not connected with the housing and which includes a U-shaped yoke whose legs extend substantially parrallel to the axis, abutment faces on the housing being engaged by corresponding faces of the yoke received therein so as to position the magnet arrangement in predetermined relation to the axis of rotation. A resilient instrumentality is arranged between the housing and the yoke for pressing the latter against at least one of the abutment faces to prevent vibrating of the magnet arrangement during operation of the motor.

Background of the invention

The present invention relates to a drive arrangement in general, and more particularly to a drive arrangement including an electromotor. Still more particularly, the invention relates to a drive arrangement of the type used in automotive vehicles for raising and lowering windows and for electrically moving sliding roofs.

It is known to construct such arrangements, which must be relatively flat and comparatively small-dimensioned because of the limited space available for them, in such a manner that the U-shaped yoke of the magnetic frame or arrangement is secured to the housing. The bight of the yoke carries one bearing for the shaft of the rotor and the legs of the yoke are secured, usually by screws, to a supporting plate which carries the other bearing and which closes the open end of the housing. Evidently, such a construction requires a considerable time and effort for assembly, which of course increases the expense of the unit. Furthermore, in such constructions it is highly important that the legs of the yoke which are secured to the supporting plate be of exactly identical length and that they are precisely secured to the supporting plate so that the bearings are in proper axial alignment and the rotor is properly centered with respect to the magnet frame. It is clear that this requires considerable care in the manufacture and assembly of this construction, including a special sizing operaton for the legs of the yoke which is made more difficult and consequently more expensive by the fact that the legs are somewhat elastic. Even after all this, however, this known construction is frequently not fluid tight where the supporting of plate closes the open end of the housing. This is, however, an important requirement, particularly in window lifters because moisture will almost inevitably intrude into the interior of the door of a vehicle where the drive arrangement is located.

It is therefore a general object of the present invention to provide an arrangement of the type here under discussion which is considerably more simple and less expensive in its construction and assembly.

A further object of the invention is to eliminate the need for sizing of the legs of the yoke.

An additional object of the invention is to make it possible to properly seal the connection between the open end of the housing and the cover provided for closing the open end.

Summary of the invention

In accordance with one featureof our invention we provide, in a structure of the type here under discussion, housing means which has a chamber defining an axis of rotation. The chamber has an open end and the housing means comprises a cover which is connected to the open end closing the same. An electromotor is provided and includes magnet means slidably received in the aforementioned chambee. The magnet means in turn includes substantially a U-shaped yoke having legs which extend substantially parallel to the axis of rotation. The housing means has abutment faces which are engaged by corresponding faces of the yoke so as to position the magnet means in the housing means in predetermined relation to the axis of rotation.

Finally, we provide resilient means between the housing means and the yoke for the purpose of pressing the latter against at least one of the aforementioned abutment faces so as to prevent vibrating of the magnet means during operation of the electromotor.

By resorting to the construction just outlined, and particularly by having the resilient means being located between the yoke and the cover closing the open end of the chamber, it is possible to properly position the magnet means in the chamber when the cover is affixed to the open end of the latter without requiring any special positioning or adjusting steps. The provision of the resilient means permits relatively significant tolerances in the length of the yoke legs, being capable of adjusting to different lengths, and thus eliminates the need for sizing of the legs in a special operation. Advantageously, the yoke may be constructed from a flat strip of suitable material and in such a construction it is not necessary to subject the ends and the bends to additional processing steps.

We have found it particularly advantageous if, contrary to known constructions, the bearing associated with the bight of the yoke is not provided on the bight itself, but rather in an end wall bounding the chamber with the bight having an aperture through which the shaft of the rotor extends with clearance. An additional advantage is to be found in constructing the yokes in such a manner that in the non-assembled condition of the device the free ends of the legs are spaced farther apart from one another than the connected ends where the legs join the bight. By having the legs be resilient so that they can be deflected towards one another, they will undergo such deflection when the yoke is inserted into the chamber and will then press in outward direction against the abutment surfaces provided internally of the chamber on the housing means. This makes it possible to construct the yoke with significant tolerance variations even in the dimensions extending transversely of the axis of rotation and this will evidently result in decreased manufacturing costs.

An additional advantage is to be obtained if the resilient means which engages the legs of the yoke will press not directly against the cover, but rather indirectly by bearing upon a brush support plate which is carried by the cover, for instance by an engaging axial shoulders provided on the latter. This eliminates the need for using special means for connecting the brush support plate and further reduces the complexity and the expense of the device.

Finally, the invention also contemplates so constructing the housing means that it will house not only an electromotor but also a gear arrangement. In this case the housing for the gear arrangement constitutes an integral part of the housing means, that is it is of one-piece construction with the housing defining the chamber for the electromotor. If the gear arrangement is a worm drive, then the construction may be particularly small and flat if the open end of the chamber is located at one end face of the housing and the chamber extends inwardly therefrom, while the open end for the recess which accepts the worm drive extends into the housing substantially normal to the axis of the chamber for the electromotor. In this case the bottom or end wall of the chamber for the electromotor may constitute a separating wall between that chamber and the recess which accommodates the worm drive.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

Brief description of the drawing

FIG. 1 is a longitudinal section through an arrangement embodying the invention;

FIG. 2 is a section taken on the line II—II of FIG. 1; and

FIG. 3 is a section through the cover shown in FIG. 1 and taken on the line III—III of FIG. 1.

Description of the preferred embodiments

The arrangement illustrated in FIG. 1 comprises a housing 11 of a suitable light metal, such as aluminum or an analogous material, and it will be seen that this housing is of one-piece construction and is provided with two chambers one of which accommodates an electromotor and the other of which accommodates a gear arrangement. The chamber accommodating the electromotor has an open end 12 extending inwardly from one axial end face of the housing and the chamber accommodating the gear arrangement has an open end 13 and extends normal or substantially normal to the elongation of the first chamber.

As FIG. 1 clearly shows, the first chamber has a section or portion 14 of substantially rectangular cross section of configuration which terminates at a bottom wall or intermediate wall 15 separating it from the second chamber 16 which is of circular cross sectional configuration. Arranged within the section 14 is a magnetic frame 17 and the rotor 18 of the electromotor, and on the shaft of the rotor there is provided in known manner a worm gear 19 which is extended through an aperture in the separating wall 15. A worm wheel 20 is arranged in the chamber 13 and cams with the worm gear 19. The worm wheel 20 is loosely seated on a shaft 21 with which latter it is connected in known manner via a sliding coupling of known type. For this reason the coupling is not illustrated.

As FIG. 1 shows, the magnetic frame 17 comprises a yoke 23 which advantageously may be constructed by suitably bending or otherwise deforming a flat strip of material. This yoke 23 comprises a bight 24 which abuts against the separating wall 15 and which is provided with an opening 25 through which the shaft 26 of the rotor 18 extends. We have found it advantageous to provide the bight and the separating wall 15 with mating aligning and locating portions, in this case illustrated as an annular projection 32 extending from the wall 15 into the section or chamber 14, and a complementarily configurated recess 33 provided in the bight 24 and into which the projection 32 extends. Evidently, this relationship could be reversed or otherwise configurated projections and recesses could be provided.

Connected with, or rather of one-piece construction with the bight 24 are two arms 27 and 28 which are resilient and which, when the yoke is located outside the chamber 14, will be spaced apart at their free ends farther than they are spaced apart at their ends where they are connected with the bight 24. In fact, the free ends, or rather the outwardly directed abutment surfaces provided on the free ends of the arms 27 and 28, will be spaced apart from one another when the yoke is located outside the chamber 24, by a distance which is greater than the inner cross sectional distance of the chamber 24 in the region of the open end thereof. This open end 12 is closed by a cover 35 which is secured with to the housing 11 by screws 36. The cover 35 is provided internally thereof with a calotte-shaped or substantially hemispherical bearing 37 consisting of sintered metal and in which one end of the rotor shaft 26 is journalled. A cylindrical bearing 38 is provided in this instance in the separating wall 15 which, of course, can be said to extend to the far left-hand side of FIG. 1. The other end of the shaft 26 is journalled in this second bearing 38.

As FIG. 1 shows, the cover 35 is provided with two projections 39 and 40 which, when the cover is connected with the housing 11, extend into the opening 12. The projections 39 and 40 are each provided with an abutment face, respectively identified with reference numerals 41 and 42, and FIG. 1 shows that these abutment faces face one another and slightly conically diverge away from one another in the direction towards the opposite or inner end of the chamber 14. The free ends of the legs 27 and 28 of the yoke abut and press against these abutment faces 41 and 42 respectively. It will be appreciated that the projections 39 and 40, as well as the projection 32 provided on the wall 15, serve to locate and center the magnet frame with respect to the axis of rotation of the armature 18 of the motor.

A supporting plate 44 is arranged in the cover 35 and carries the brushes 46 and 47 which cooperate with a commutator 45. In accordance with the invention the supporting plate 44 abuts against shoulders 48 provided internally of the cover 35, as is clearly shown in FIG. 3. Interposed between the supporting plate 44 and the axially directed end faces of the free ends of the legs 27 and 28 are biassing means, here illustrated as spring members 49 and 50. In the illustrated embodiment these members 49 and 50 each consist of a flat strip of spring material which is bent into the configuration shown in FIG. 3. In other words, each of the spring elements comprises a portion 51 and two arms 52 and 53 having free ends 54 and 55, respectively, which are bent over outwardly as shown in FIG. 3. The portions 51 respectively abut against the free axial end faces of the legs 27 and 28 of the yoke, while the end faces 56 and 57 of the bent-over end portions 54 and 55 abut with bias against the inner wall of the cover 35. It will be appreciated, particularly from a consideration of FIG. 1, that these biassing or spring elements 49 and 50 not only serve to press the magnetic frame against the wall 15, but also to press the supporting plate 44 against the shoulders 48 of the cover 35, thus maintaining both the plate 44 and the magnet frame 17 in proper relation against vibration during operation of the motor.

The construction shown by way of example in FIGS. 1, 2 and 3 is assembled by first securing the brushes and associated elements to the supporting plate 44 and thereupon placing the plate 44 with the various elements into the cover 35. Now the spring elements 49 and 50 are inserted, by lightly compressing the arms 52 and 53 towards one another and subsequently releasing them so that the edge faces 56 and 57 will engage the inner wall surface of the cover 35 with bias. Now the magnet frame is introduced into the chamber 14 and in this context it should be noted that advantageously the opening 25 provided in the bight 24 may be constructed in one operating step with the aperture 16 provided in the wall 15, that is after the magnet frame is already introduced into the chamber 14. Now, the rotor 18 is introduced and the cover 35 secured to the housing 11 whose cross sectional configuration is, incidentally, most clearly and visible in FIG. 2. Securing of the cover 35 to the housing 11 effects resilient deflection of the legs 27 and 28 towards the axis of rotation of the motor until they extend exactly parallel with this axis of rotation. It will be appreciated, of course, that the abutment surfaces 41 and 42 prevent turning of the magnet frame 17, which includes the pole pieces or magnet pieces 29 and 30 respectively carried by the legs 27 and 28, about the cylindrical projection 32 of the wall 15. Of course, the projection 32 need not be cylindrical and would, if otherwise configurated, also serve to prevent such turning.

It will be understood that each of the elements described above, or two or more together, may also find a useful application in other types of constructions differing from the types described above.

While the invention has been illustrated and described as embodied in a drive arrangement, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. In a structure of the character described, housing means having a chamber defining an axis of rotation and having an open end and a cover connected to said open end closing the same; an electromotor, comprising magnet means slidably received in said chamber of said housing means and including a substantially U-shaped yoke having legs extending substantially parallel to said axis and magnet members connected to said legs and projecting towards said axis, said housing means having abutment faces engaged by corresponding faces of said yoke so as to position said magnet means in said housing means in predetermined relation to said axis; and resilient means between said housing means and said yoke for pressing the latter against at least one of said abutment faces so as to prevent vibrating of said magnet means during operation of said electromotor.

2. In a structure as defined in claim 1, wherein said housing means has an inner wall provided with one of said abutment faces inwardly spaced from and located oppositely of said open end, said yoke having a bight extending transversely of said legs connecting the same, and said magnet means being received in said housing means with the free ends of said legs facing said open end.

3. In a structure as defined in claim 2, said resilient means being arranged between said free ends of said legs and said cover bearing upon both, and pressing said bight against said one abutment face.

4. In a structure as defined in claim 2, said housing means having an inner circumferential surface provided with a pair of additional abutment faces in the region of said open end, said additional abutment faces being engaged by corresponding faces provided on said legs.

5. In a structure as defined in claim 4, said housing means having a predetermined inner cross-sectional dimension between the abutment faces of said pair, and said yoke being elastically compressible and having, prior to sliding insertion into said housing means, an outer predetermined dimension between said corresponding faces which is greater than said inner dimension so that said legs are inwardly compressed in direction towards one another when said yoke is inserted into said housing means, whereby to obtain biased engagement in between said pair of abutment surfaces and the respective corresponding faces.

6. In a structure as defined in claim 2, and further comprising a rotatable armature located between said legs and having a shaft extending along said axis; and bearing means in which opposite end portions of said shaft are journalled, said bearing means including a bearing carried by said inner wall and said bight having an aperture through which an end portion of said shaft extends with clearance to said bearing means.

7. In a structure as defined in claim 2, said bight being provided with a recess facing said one abutment face and the latter being provided with a projection extending into said recess and abuttingly engaging said bight.

8. In a structure as defined in claim 3, said cover being provided with an internal shoulder facing with said open end; and further comprising a carrier plate for the brushes of said electromotor, said carrier plate abutting against said shoulder and said resilient means abutting against said carrier plate and being confined between the same and said free ends of said legs.

9. In a structure as defined in claim 1; said housing means further having another chamber provided with another open side and being adapted to receive a gear drive which is to be operatively associated with said electromotor.

10. In a structure as defined in claim 9; and further comprising a worm gear drive received in said other chamber and operatively connected with said electromotor so as to be driven thereby.

11. In a structure as defined in claim 9, said other chamber having a longitudinal axis extending transversely of said axis of rotation.

12. In a structure as defined in claim 9, said housing means further having an other chamber provided with an other open end and being adapted to receive a gear drive in operative association with said electromotor; and wherein said inner wall separates said chambers from one another.

13. In a structure as defined in claim 4, wherein said cover comprises a wall portion located within the confines of said open end when said cover is connected to the latter, closing the same, said wall portion comprising an inwardly directed surface constituting a part of said inner circumferential surface and being provided with said additional abutment faces.

References Cited
UNITED STATES PATENTS

| | | | |
|---|---|---|---|
| 2,639,394 | 5/1953 | Douglas | 310—83 |
| 2,885,962 | 5/1959 | Campbell | 310—88 X |
| 3,143,897 | 8/1964 | Kohn | 310—89 X |
| 3,269,204 | 8/1966 | Schleicher | 310—75 X |

WARREN E. RAY, Primary Examiner

U.S. Cl. X.R.

310—83, 89